Patented June 5, 1945

2,377,834

UNITED STATES PATENT OFFICE 2,377,834

REDUCING SYNERESIS OF METHYL CELLULOSE

Peter R. Wenck, Midland, Mich., assignor to The Dow Chemical Company, Midland, Mich., a corporation of Michigan No Drawing. Application July 4, 1942, Serial No. 449,842

2 Claims. (Cl. 252—1)

This invention relates to a methyl cellulose composition and more particularly to a composition thickened and stabilized with methyl cellulose of reduced tendency to undergo syneresis.

Methyl cellulose, prepared by the alkylation of an alkali cellulose, is widely used as a thickening agent for pastes, such as printing and dye pastes, and for stabilizing colloidal suspensions of many types. Its use for this purpose is advantageous, since it is very stable chemically, can be used in acid, neutral or alkaline media, and is resistant to bacterial or fungal decomposition. In many instances, however, it is desirable to warm the aqueous composition which has been thickened or stabilized with methyl cellulose, and it has been found that when such compositions are heated the methyl cellulose gels and synerizes with the appearance of a thin watery phase which is only slowly taken up again by the methyl cellulose upon cooling. Because of this tendency of the methyl cellulose to undergo syneresis its use as a thickening and stabilizing agent has heretofore been largely limited to those aqueous compositions which it is not necessary or desirable to heat.

It is, therefore, an object of the present invention to provide an aqueous composition thickened or stabilized with methyl cellulose which has a reduced tendency to undergo syneresis. An additional object is to provide a methyl cellulose composition useful in the preparation of thickened aqueous dispersions of reduced tendency to undergo syneresis.

These and related objects are readily accomplished by including with the methyl cellulose a water-soluble salt of cellulose glycolic acid.

The methyl cellulose herein referred to is the cold water-soluble product prepared by the alkylation of an alkali cellulose. It is well known that methyl cellulose of low methoxy content is insoluble in water but may be soluble in water containing alkalies or alkaline salts. Methyl cellulose of somewhat higher methoxy content is soluble in cold water alone, although it is substantially insoluble in hot water. Such cold water-soluble methyl cellulose is, however, usually more readily soluble in cold water after a preliminary treatment with hot water although the present invention is not limited to methyl cellulose requiring such preliminary treatment with hot water. When solutions of a cold water-soluble methyl cellulose which have been prepared by methylating an alkali cellulose are heated, gelatin occurs at a temperature which depends upon the intrinsic viscosity and concentration of the methyl cellulose in the solution. Such gelatin is usually accompanied by syneresis and the separated watery phase is not readily absorbed by the methyl cellulose when the composition is cooled.

Although any water-soluble salt of cellulose glycolic acid may be used, a water-soluble salt, such as the ammonium or an alkali-metal salt, of a cellulose glycolic acid of such degree of substitution that its sodium salt is soluble in water is preferred. It is well known that all cellulose glycolic acids form sodium salts. However, the sodium salts of lowly substituted cellulose glycolic acids are soluble in water only in the presence of an alkaline reacting compound, e. g. sodium hydroxide, potassium hydroxide, alkaline salts, etc. Cellulose glycolic acids of somewhat higher degree of substitution form sodium salts which are readily soluble in water alone, and it is with the water-soluble salts of such cellulose glycolic acids that the present invention is concerned. Such water-soluble salts are readily available commercially. Although a previously prepared water-soluble salt of the cellulose glycolic acid is preferably used, it should be mentioned that the free cellulose glycolic acid may be used, if desired, in which case the acid may be converted readily to a water-soluble salt by stirring it, together with the appropriate alkali, in water.

In preparing aqueous compositions of the present invention the methyl cellulose is usually dissolved by stirring it into hot water and then cooling the suspension. In this manner the methyl cellulose is readily dispersed to form a thickened composition. The soluble salt of the cellulose glycolic acid may be added to the hot water with the methyl cellulose or it may be dissolved separately in a portion of the water and this portion subsequently added to the remainder of the thickened composition or the soluble salt of the cellulose glycolic acid may be stirred into the thickened composition after it has been allowed to cool. Alternately the water-soluble salt and the cold water-soluble methyl cellulose may be mixed in the dry state and stored, if desired, and the mixture then used in preparing a thickened solution or suspension of reduced tendency to undergo syneresis when heated. Other ways of preparing the composition are apparent.

Other ingredients, such as those ordinarily incorporated in compositions thickened with methyl cellulose may be incorporated in the thickened composition of the present invention in the same manner in which they are usually incorporated in such compositions which do not contain such water-soluble salt of cellulose glycolic acid.

Although the ratio by weight of water-soluble salt of cellulose glycolic acid to cold water-soluble methyl cellulose in the composition may be varied over a wide range, it is usually maintained below 1.0 and preferably between 0.01 and 0.25, i. e., the preferred amount of cellulose glycolic acid salt is from 1 to 25 per cent of the weight of methyl cellulose employed in the composition, while the maximum amount of cellulose glycol acid salt does not exceed the weight of the methyl cellulose. It should also be mentioned that since the water-soluble salts of cellulose glycolic acid exert a thickening effect when dissolved in water, the amount of methyl cellulose required to yield a composition of any desired viscosity may be reduced over that required to yield the same viscosity in the absence of a salt of cellulose glycolic acid. The proportion of the mixture of water-soluble salt of cellulose glycolic acid and cold water-soluble methyl cellulose used in the aqueous composition will depend, among other factors, upon the viscosity desired and upon the intrinsic viscosity of the methyl cellulose used. The invention contemplates the use of methyl cellulose of any desired intrinsic viscosity and the use of the mixture in the aqueous composition in amount sufficient to impart the desired viscosity thereto.

In a series of experiments designed to illustrate the reduced tendency of aqueous methyl cellulose compositions containing sodium cellulose glycolate to undergo syneresis, solutions were prepared containing 0.1 per cent by weight of sodium cellulose glycolate together with 1, 2 and 3 per cent respectively of cold water-soluble methyl cellulose. The solutions were prepared by adding the sodium cellulose glycolate and the methyl cellulose to hot water and stirring the suspension while it cooled. By way of comparison, 1, 2 and 3 per cent solutions of methyl cellulose alone and a 0.1 per cent solution of sodium cellulose glycolate alone were prepared. 200 c. c. of each of the seven solutions were then heated in a steam autoclave at about 115° C. for 30 minutes and the volume of separated watery layer noted. The solutions were then allowed to cool and the volume of the separated watery layer which had not been reabsorbed was again noted in each case. The results are recorded under samples 1 to 7 inclusive in the following table.

*Reduced syneresis of methyl cellulose in aqueous dispersion*

| Sample No. | Solute in 200 c. c. solution, grams | | Vol. of separated watery layer, c. c. | |
|---|---|---|---|---|
| | Methyl cellulose | Sodium cell. glycolate | Hot solution | Cooled solution |
| 1 | 6.0 | 0.2 | 8.0 | 4.0 |
| 2 | 4.0 | 0.2 | 4.0 | 0.0 |
| 3 | 2.0 | 0.2 | 2.0 | 0.0 |
| 4 | 6.0 | | 45.0 | 41.0 |
| 5 | 4.0 | | 33.0 | 29.0 |
| 6 | 2.0 | | 28.0 | 27.0 |
| 7 | | 0.2 | 0.0 | 0.0 |
| 8 | 6.0 | 0.6 | 2.0 | 0.0 |

From the results of this experiment it is apparent that the presence of as little as 3.3 per cent or less of sodium cellulose glycolate based on the methyl cellulose in a thickened aqueous composition greatly reduces the syneresis of the methyl cellulose. When the amount of sodium cellulose glycolate is increased to approximately 10 per cent of the weight of the methyl cellulose in the composition, syneresis is substantially entirely prevented.

In another experiment a dry mixture of 10 per cent by weight of sodium cellulose glycolate and 90 per cent of methyl cellulose was prepared by mixing the two dry substances intimately. 6.6 grams of the dry mixture was then dissolved in 200 grams of water and the solution heated and cooled and the volume of watery layer noted as previously described. The results, which were comparable with those obtained in the first experiment, are listed under sample 8 in the accompanying table.

I claim:

1. A thickened and stabilized aqueous composition of reduced tendency to synerize at elevated temperatures comprising a cold water-soluble methyl cellulose and a water-soluble salt of a cellulose glycolic acid in an amount not to exceed the weight of the methyl cellulose.

2. A thickened and stabilized aqueous composition of reduced tendency to synerize at elevated temperatures comprising a cold water-soluble methyl cellulose and from 1 to 25 per cent of the weight of said methyl cellulose of a water-soluble salt of cellulose glycolic acid.

PETER R. WENCK.